US006424395B1

(12) United States Patent
Sato et al.

(10) Patent No.: US 6,424,395 B1
(45) Date of Patent: Jul. 23, 2002

(54) LIGHT SCATTERING FILM AND LIQUID CRYSTAL DISPLAY DEVICE

(75) Inventors: Atsushi Sato; Luis Manuel Murillo-Mora, both of Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/286,448

(22) Filed: Apr. 6, 1999

(30) Foreign Application Priority Data

Apr. 8, 1998  (JP) .......................................... 10-096411
Dec. 7, 1998  (JP) .......................................... 10-346743

(51) Int. Cl.⁷ ............................................. G02F 1/1335
(52) U.S. Cl. ......................................... 349/112; 349/64
(58) Field of Search ............................ 349/112, 96, 64; 359/599

(56) References Cited

U.S. PATENT DOCUMENTS

| 3,922,455 | A | * | 11/1975 | Brumlik ....................... 428/85 |
| 4,257,997 | A | * | 3/1981 | Soehngen .................... 264/145 |
| 4,336,978 | A | | 6/1982 | Suzuki ......................... 350/167 |
| 4,354,730 | A | * | 10/1982 | Bel ............................... 350/54 |
| 4,583,851 | A | * | 4/1986 | Yataki ........................ 356/73.1 |
| 4,914,349 | A | * | 4/1990 | Matsui et al. ................ 313/524 |
| 5,217,650 | A | * | 6/1993 | Theophilou et al. ......... 252/500 |
| 5,299,275 | A | | 3/1994 | Jackson et al. .............. 385/116 |
| 5,365,354 | A | | 11/1994 | Jannson et al. ............... 359/15 |
| 5,442,482 | A | | 8/1995 | Johnson et al. .............. 359/619 |
| 5,475,515 | A | | 12/1995 | Yoshinaga et al. ............ 359/52 |
| 5,534,386 | A | | 7/1996 | Petersen et al. ............. 430/320 |
| 5,606,638 | A | * | 2/1997 | Tymianski et al. .......... 385/143 |
| 5,706,065 | A | * | 1/1998 | Yano ........................... 349/112 |
| 5,726,730 | A | * | 3/1998 | Crawford et al. ............ 349/196 |

(List continued on next page.)

FOREIGN PATENT DOCUMENTS

| DE | 19738327 | 9/1997 |
| EP | 0 118 951 | 6/1987 |
| EP | 0 294 122 | 12/1988 |
| EP | 0 671 638 | 9/1995 |
| JP | 6-67026 | 3/1994 |
| WO | WO 97/08571 | 3/1997 |

OTHER PUBLICATIONS

Kuwabara Et Al. "An Otical Design for Reflective Color STN–LCDS" ASID 99, Proceeding of the 5th Asian Symposium 1999, pp. 37–40.*
Tachibana Et Al., "Study on Miire Between Screen and Panel Structure in a LCD Rear Project for HDTV", Dislay Resaerch Conference 1991, Conference Record of the 1991 International 1991, pp. 143–166.*
Alfrey Et Al.; "Physcail Optics of Iridescent Mutilyyered Plastic Film"; Polymer Engineering and Science, vol. 9, No. 6, Nov. 1969, pp. 400–404.*
09113904 Abstract of Japen, Oct. 20, 1995.
61243403 Abstract of Japan, Apr. 19, 1985.

Primary Examiner—William L. Sikes
Assistant Examiner—Hoan Nguyen
(74) Attorney, Agent, or Firm—Staas & Halsey LLP

(57) ABSTRACT

The present invention provides a light scattering film, including a plurality of first transparent regions each having a fibril-like cross section, and a plurality of second transparent regions differing in refractive index range from the first transparent region, wherein each of the first transparent regions is positioned to permit the long axis of the fibril-like cross section to cross one main surface of the film and to permit each of the fibril-like cross sections of the first transparent regions to be sandwiched between adjacent second transparent regions in a direction of the short axis of the fibril-like cross section. The present invention also provides a liquid crystal display device, having a liquid crystal panel and a light scattering film formed on one main surface of the liquid crystal panel.

17 Claims, 8 Drawing Sheets

U.S. PATENT DOCUMENTS 5,766,531 A * 6/1998 Cadieux et al. .......... 264/210.8
5,843,559 A * 12/1998 Cadieux et al. ............. 428/113
5,928,819 A * 7/1999 Crawford et al. ............. 430/20
5,976,686 A * 11/1999 Kaytor et al. ............ 428/317.9
5,990,995 A * 11/1999 Ebihara et al. ............. 349/113
6,045,894 A * 4/2000 Jonza et al. ................ 428/212
6,147,934 A * 11/2000 Arkawa ....................... 368/84
6,147,937 A * 11/2000 Arkawa ....................... 368/242

* cited by examiner

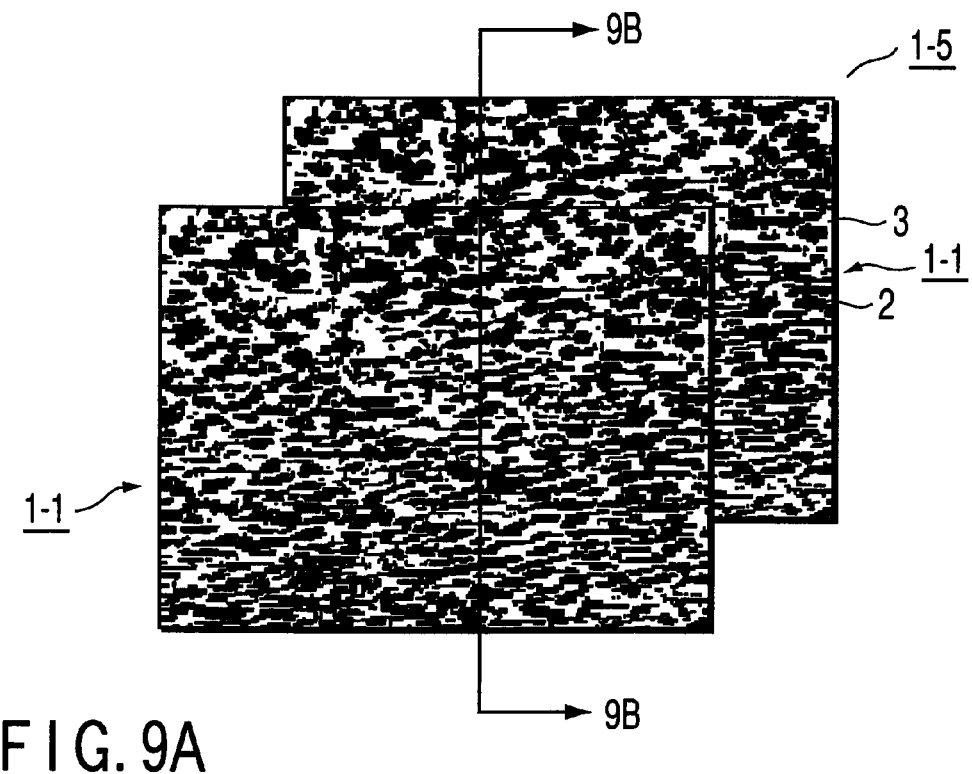
F I G. 9A
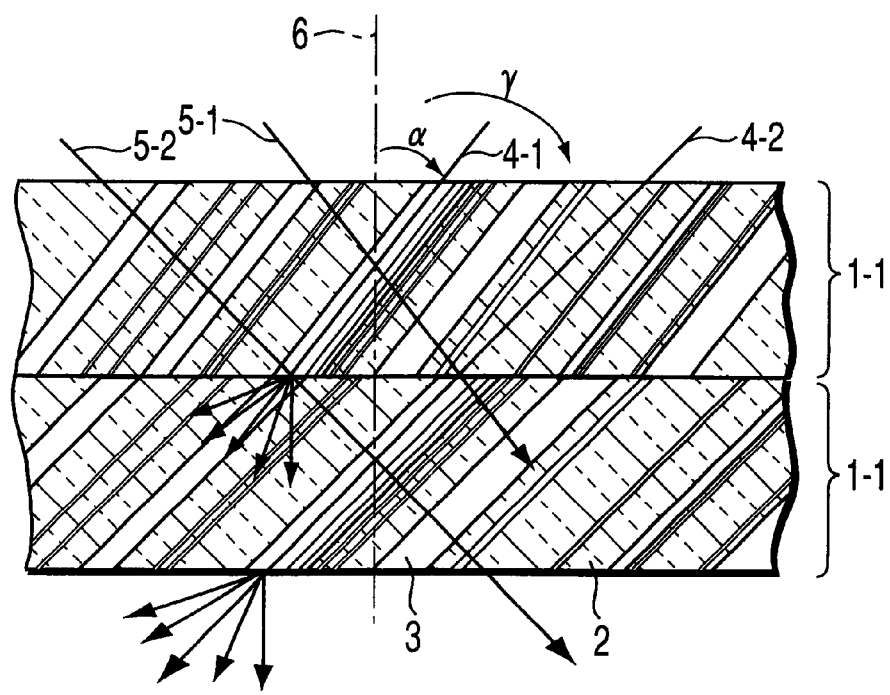
F I G. 9B

LIGHT SCATTERING FILM AND LIQUID CRYSTAL DISPLAY DEVICE

BACKGROUND OF THE INVENTION

The present invention relates to a light scattering film, and a liquid crystal display device having a light scattering film. In the present invention, the terms "scattering" and "diffusion" are used with no distinction as long as they are used in relation to optics.

A light scattering film is used in a liquid crystal display device in order to achieve a wide viewing angle or to achieve display of a uniform brightness over the entire screen. In a reflection type liquid crystal display device, such a light scattering film is pasted to a display surface of a liquid crystal panel.

It was customary in the past to use a light scattering film prepared by roughening the surface of a polymer film. Such a light scattering film is prepared by applying a physical processing such as a sand blasting treatment to the surface of a polymer film or by a chemical treatment using an acidic or basic solution.

The light scattering film permits all the incident light to be diffused without relying on the incident angle, the incident direction or the incidence plane. Therefore, where such a light scattering film is used in a reflection type liquid crystal display device utilizing the solar light or external illumination as a light source, the light scattering takes place both at the time when the light emitted from the light source is incident on the liquid crystal panel and at the time when the light modulated by the liquid crystal layer became reflected and emerges out of the liquid crystal panel. As a result, a double image is observed, or the image is blurred. In other words, the displayed image is made unclear or the contrast is lowered.

Since the light scattering film diffuses the incident light isotropically, a wide viewing angle can be obtained. However, the viewing angle and the brightness of display bears a trade-off relationship. Specifically, it is difficult to achieve a bright display by using the light scattering film.

In general, it suffices for the liquid crystal display device used in a portable telephone or PDA to have a viewing angle permitting a single user to recognize the displayed image. In other words, the viewing angle in a horizontal direction need not be unduly large in the liquid crystal display device used in these instruments. Since these instruments are used at a height of the eye or disposed on the lap, the viewing angle should desirably be large in a vertical direction. By contraries, in a liquid crystal television, etc., the viewing angle of the liquid crystal display device need not be large in a vertical direction and should desirably be large in a horizontal direction.

As describe above, the required direction of a large viewing angle differs depending on the use of the liquid crystal display device. Therefore, a sufficient brightness of display and a large viewing angle can be obtained simultaneously by increasing the viewing angle in a required direction alone. It follows that the light scattering film used in a liquid crystal display device is required to scatter light anisotropically.

It is known to the art that a polymer film having light diffusing fine particles dispersed therein can be used as a light scattering film. In order to realize the above-noted light scattering characteristics in the light scattering film, various efforts are being made in an attempt to control the refractive index, size, shape, etc. of the light diffusing fine particles.

However, it is technically difficult to realize the particular light scattering characteristics by the method referred to above. Even if realized, the light scattering characteristics are not satisfactory enough to put the light scattering film to practical use.

For example, Japanese Patent Disclosure (Kokai) No. 8-201802 discloses a light scattering plate which permits transmitting the light incident on one main surface while suppressing the light scattering substantially completely and also permits selectively scattering the light incident on the other main surface. However, this prior art simply teaches that the light scattering plate is obtained by solidifying transparent fine particles with a transparent polymerizable high molecular compound, failing to teach the specific construction of the light scattering plate. It is considered reasonable to understand that the light scattering plate disclosed in JP '802 is equal in construction to the known polymer film having fine light diffusing particles dispersed therein, and therefore, the light scattering characteristics above cannot be obtained.

Japanese Patent Disclosure No. 9-152602 discloses a liquid crystal display device using a hologram. The device disclosed in this prior art is a transmitting type liquid crystal display device having a back light as a light source arranged behind a liquid crystal panel. In this device, a light scattering plate is arranged between the liquid crystal panel and the back light, and a hologram is arranged on the front face of the liquid crystal panel. The hologram thus arranged permits anisotropically diffusing the light. In the case of using a hologram, however, the light is unavoidably dispersed to exhibit the spectral colors, with the result that the color of the displayed image differs depending on the viewing point.

BRIEF SUMMARY OF THE INVENTION

An object of the present invention is to provide a light scattering film which permits displaying a clear image when used in a liquid crystal display device and a liquid crystal display device using the particular light scattering film.

Another object is to provide a light scattering film which permits realizing a sufficiently large viewing angle and also permits a bright display when used in a liquid crystal display device and a liquid crystal display device using the particular light scattering film.

Still another object of the present invention is to provide a light scattering film which permits preventing the color of the displayed image from being changed in accordance with movement of the viewing point and a liquid crystal display device using the particular light scattering film.

According to an aspect of the present invention, there is provided a light scattering film, comprising a plurality of first transparent regions each having a fibril-like cross section, and a plurality of second transparent regions differing in refractive index range from the first transparent region, wherein each of the first transparent regions is positioned to permit the long axis of the fibril-like cross section to cross one main surface of the film and to permit each of the fibril-like cross sections of the first transparent regions to be sandwiched between adjacent second transparent regions in a direction of the short axis of the fibril-like cross section.

According to another aspect of the present invention, there is provided a liquid crystal display device, comprising a liquid crystal panel, and a light scattering film mounted on one main surface of the liquid crystal panel, wherein the light scattering film includes a plurality of first transparent regions each having a fibril-like cross section, and a plurality of second transparent regions differing in refractive index range from the first transparent region, and wherein each of the first transparent regions is positioned to permit the long axis of the fibril-like cross section to cross one main surface of the film and to permit each of the fibril-like cross sections of the first transparent regions to be sandwiched between adjacent second transparent regions in a direction of the short axis of the fibril-like cross section.

The light scattering film of the present invention comprises a plurality of first transparent regions each having a fibril-like cross section and a plurality of second transparent regions each interposed between adjacent first transparent regions. The first transparent region and the second transparent region differ from each other in refractive index range. It follows that, where each of the fibril-like cross sections of the first transparent regions has a width narrow enough to diffuse the light incident in a direction nearly parallel to the long axis of the fibril-like cross section, the light scattering film of the present invention permits the light incident in a direction of the long axis of the fibril-like cross section of the first transparent region to be scattered and also permits the light incident in a direction of the short axis of the fibril-like cross section to be transmitted without being scattered. In other words, the light scattering film of the present invention exhibits various light scattering characteristics dependent on the incident direction of the light.

Where the light scattering film of the present invention is used in a reflection type liquid crystal display device, the light emitted from a light source such as the sun or an external illumination is scattered when the light is incident on the liquid crystal panel, and the light emerging out of the liquid crystal panel toward the observer is transmitted without being scattered. It follows that a reflection type liquid crystal display device using the light scattering film of the present invention permits displaying a clear image.

Where the light scattering film of the present invention is used in a transmitting type liquid crystal display device, the effective light for the display can be selectively scattered, leading to a high display contrast.

Further, where the light scattering film of the present invention is used in a transmitting type liquid crystal display device, the light emitted from a light source such as a back light is partly scattered, with the remainder being transmitted without being scattered or being subjected to total reflection. Where the light scattering film is designed to allow almost all the light components effective for the display to be scattered, it is substantially impossible for the transmitted light that is not scattered to be perceived by the observer. On the other hand, the light reflected in a manner of total reflection, which is not scattered, is utilized again for the display so as to suppress the loss of light, making it possible to achieve a bright display. Incidentally, the light scattering film of the present invention may be arranged either between the liquid crystal panel and the back light or on the observer's side of the liquid crystal panel.

In the light scattering film of the present invention, it is desirable for those portions of the first and second transparent regions which are exposed to a main surface of the film to have a shape elongated in substantially one direction. In this case, it is possible to impart anisotropy to the light scattering direction. What should be noted is that, since the light diffusing direction can be controlled, it is possible to realize a large viewing angle and a sufficiently bright display simultaneously in the case of using the light scattering film of the present invention in a liquid crystal display device.

The light scattering film of the present invention does not split light, and there is not color dispersion to produce a spectral distribution unlike the hologram, with the result that the color of the displayed image is not changed in accordance with the movement of the viewing point.

In the present invention, the long axes of the fibril-like cross sections of the first transparent regions are substantially parallel to each other. Each of the second transparent regions also has a fibril-like cross section. It is desirable for the long axis of the fibril-like cross section of each of the first transparent regions to be substantially parallel to the long axis of the fibril-like cross section of each of the second transparent regions. In this case, if the fibril-like cross section of each of the second transparent regions has a width narrow enough to diffuse the light incident in a direction parallel to the long axis of the fibril-like cross section, each of the first and second transparent regions contributes to the scattering of light, leading to a high scattering performance.

Each of the first and second transparent regions, which may be shaped in various fashions such as a needle-like shape, a columnar shape or a ramentum-like shape, are generally formed to have fibril-like shape. It is possible for each of the first and second transparent regions to extend from one main surface to the other main surface of the light scattering film. It is also possible for at least a part of the first and second transparent regions to have a laminate structure laminated one upon the other along the long axis of the fibril-like cross section. Further, those portions of the first and second transparent regions which are exposed to one main surface of the light scattering film may be arranged as a speckle pattern. The particular construction can be formed by utilizing, for example, a speckle pattern.

Where the long axis of the fibril-like cross section of each of the first and second transparent regions is substantially perpendicular to one main surface of the light scattering film, the light scattering film of the present invention can be used effectively in a transmitting type liquid crystal display device. On the other hand, where the long axis of the fibril-like cross section of each of the first and second transparent regions is inclined relative to one main surface of the light scattering film, the light scattering film of the present invention can be used effectively in a reflection type liquid crystal display device.

Additional objects and advantages of the invention will be set forth in the description which follows, and in part they will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9A is a plan view schematically showing the light scattering film according to a fifth embodiment of the present invention;

FIG. 9B is a cross sectional view along the line 9B—9B shown in FIG. 9A;

DETAILED DESCRIPTION OF THE INVENTION

Figure 1A:
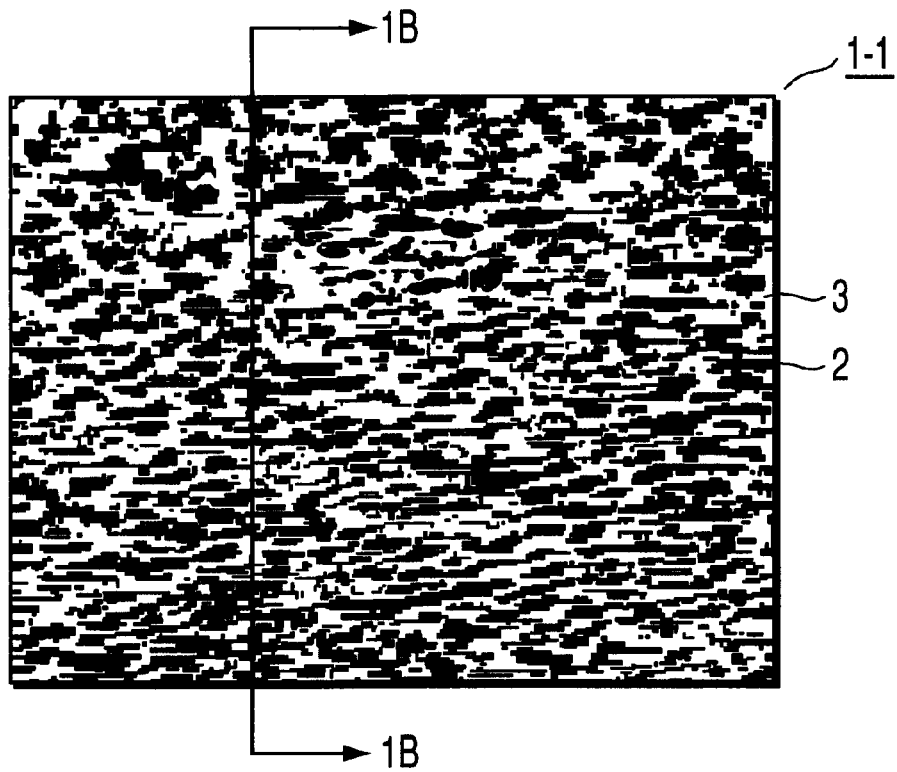
FIG. 1A is a plan view schematically showing the light scattering film according to a first embodiment of the present invention.

The present invention will now be described in detail with reference to the accompanying drawings. In the accompanying drawings, common members of the device are denoted by the same reference numerals so as to avoid an overlapping description.

The light scattering film according to the first and second embodiments of the present invention will now be described.

Figure 1B:
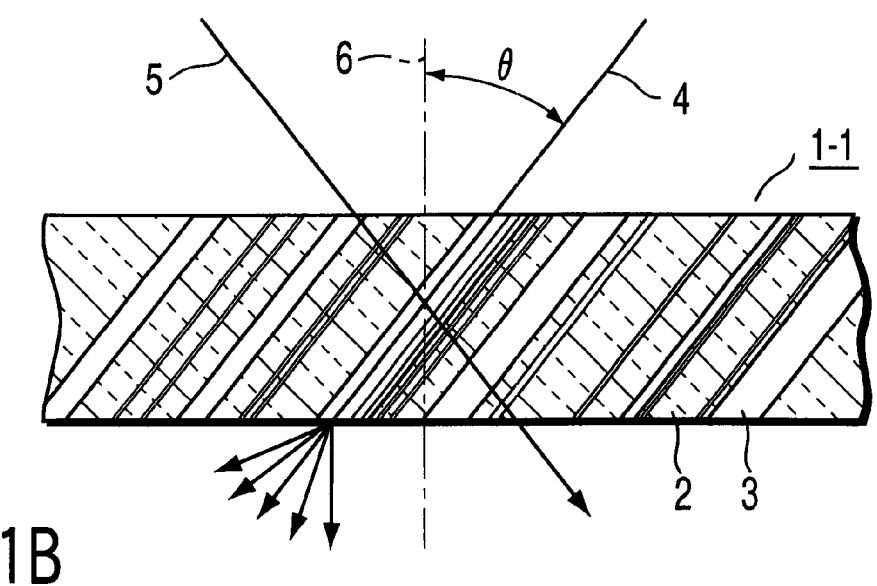
FIG. 1B is a cross sectional view along the line 1B—1B shown in FIG. 1A.

Specifically, FIG. 1A is a plan view schematically showing the light scattering film according to a first embodiment of the present invention. On the other hand, FIG. 1B is a cross sectional view along the line 1B—1B shown in FIG. 1A. Each of reference numerals 4 and 5 shown in FIG. 1B represents an incident light, with 74 denoting an angle made between a line 6 normal to a main surface of a light scattering film 1-1 and the incident light 4.

As shown in FIG. 1A, the light scattering film 1-1 according to the first embodiment of the present invention is horizontally long sized. Also, the light scattering film 1-1 comprises transparent regions 2 and other transparent regions 3, as shown in FIGS. 1A and 1B.

The transparent regions 2 and 3 differ from each other in refractive index range. These transparent regions 2 and 3 extend irregular along the long side of the film 1-1, as shown in FIG. 1A. Also, each of these transparent regions 2 and 3 has a band-like cross sectional shape or a fibril-like cross sectional shape, and the fibril-like cross section is inclined relative to a main surface of the film 1-1, as shown in FIG. 1B. In other words, these transparent regions 2 and transparent regions 3 are both formed to have fibril-like shape, and the light scattering film 1-1 is of a laminate structure in which the transparent regions 2 and 3 are alternately laminated obliquely one upon the other.

In the light scattering film 1-1, each of the transparent regions 2 and 3 extend from the upper surface to reach the lower surface of the film 1-1. However, it is not absolutely necessary for these transparent regions 2 and 3 to have such a shape.

Figure 2A:
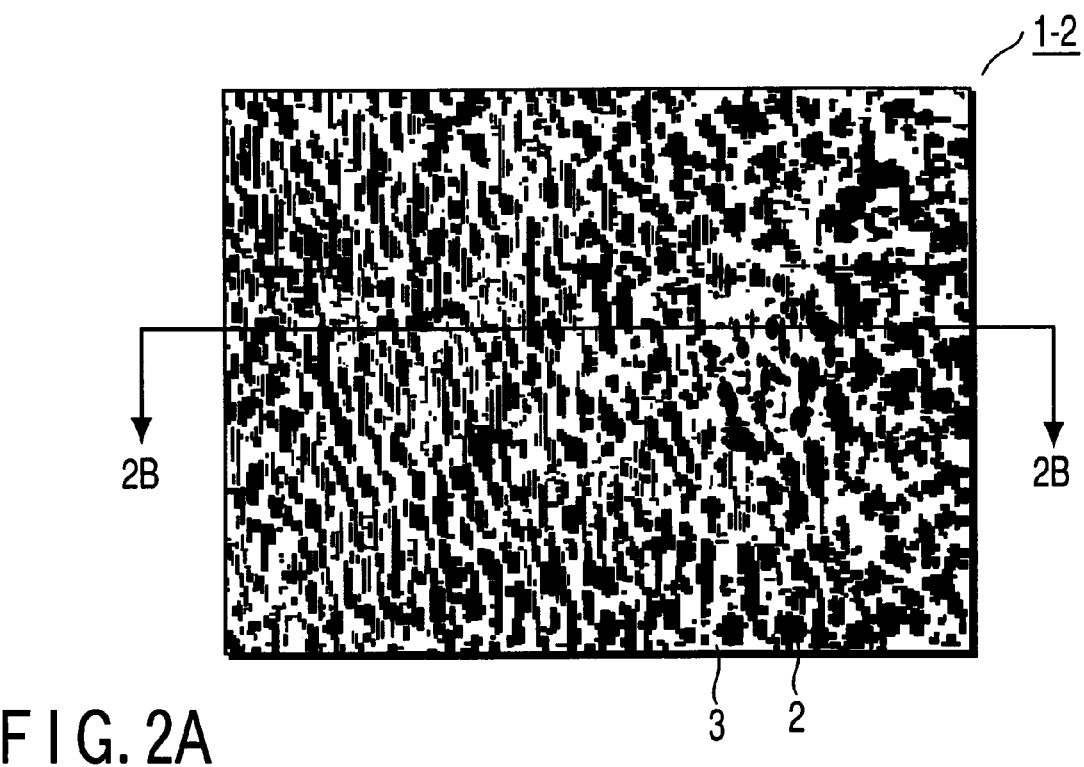
FIG. 2 is a plan view schematically showing the light scattering film according to a second embodiment of the present invention.
FIG. 2B is a cross sectional view along the line 2B—2B shown in FIG. 2A.
Figure 2B:
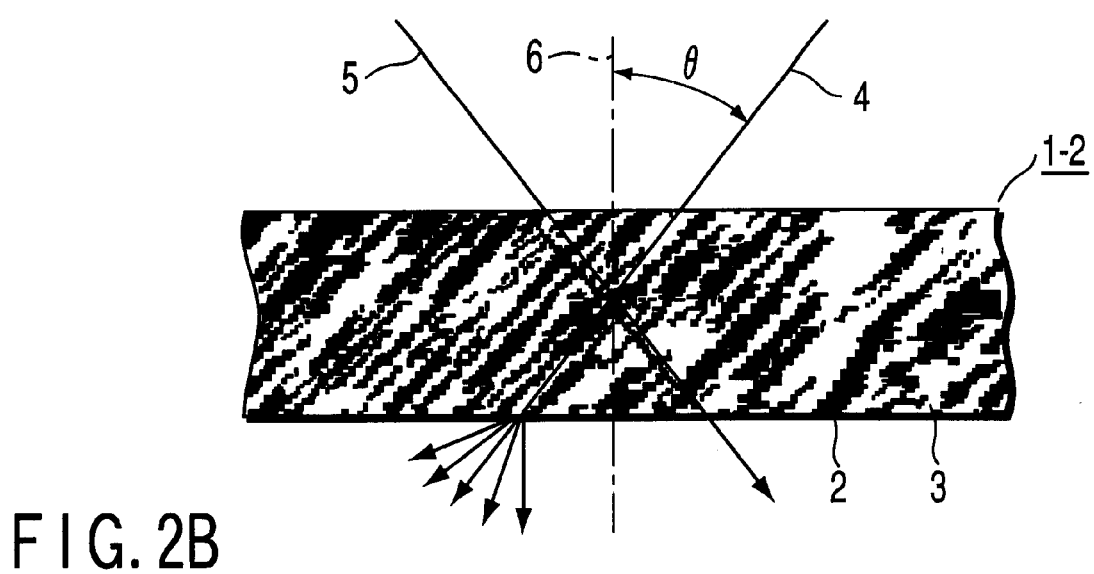

FIG. 2A is a plan view schematically showing a light scattering film 1-2 according to a second embodiment of the present invention, and FIG. 2B is a cross sectional view along the line 2B-2B shown in FIG. 2A. As shown in FIG. 2A, the light scattering film 1-2 according to the second embodiment of the present invention is horizontally long sized. Also, the light scattering film 1-2 consists of transparent regions 2 and transparent regions 3, as shown in FIGS. 2A and 2B.

The transparent regions 2 and the transparent regions 3 included in the light scattering film 1-2 differ from each other in refractive index range as in the light scattering film 1-1 described previously. These transparent regions 2 and 3 are shaped irregulars in FIG. 2A as in FIG. 1A. However, these transparent regions 2 and 3 in FIG. 2A differ from those in FIG. 1A in that these transparent regions extend along the short side of the film 1-2. Also, each of these transparent regions 2 and 3 are shaped like a band in cross section as shown in FIG. 2B, and the fibril-like cross section of each of these transparent regions 2 and 3 is inclined relative to a main surface of the film 1-2. In short, these transparent regions 2 and transparent regions 3 are both formed to have fibril-like shape, and the light scattering film 1-2 is of a laminate structure in which the transparent regions 2 and 3 are alternately laminated obliquely one upon the other, as in the film 1-1 of the first embodiment.

The second embodiment differs from the first embodiment in that these transparent regions 2 and 3 are alternately laminated one upon the other at least partly along the long axis of the fibril-like cross section, as shown in FIG. 2B. Also, the boundary between the transparent region 2 and the transparent region 3 in the light scattering film 1-2 is not so clear as in the light scattering film 1-1.

The optical characteristics of these light scattering films 1-1 and 1-2 will now be described. First of all, let us describe the case where the upper surface of the light scattering film 1-1 or 1-2 is irradiated with the incident light 4 parallel to the long axis of the fibril-like cross section of each of the transparent regions 2 and 3, as shown in FIGS. 1B and 2B. If the length in the direction of the short axis of the cross section of each of these transparent regions 2 and 3 is sufficient small, the incident light 4 brings about diffraction so as to be diffused. On the other hand, where the upper surface of the light scattering film 1-1 or 1-2 is irradiated with the incident light 5 nearly perpendicular to the long axis of the fibril-like cross section of the each of the transparent regions 2 and 3, the incident light 5 is scarcely diffused so as to be transmitted through the film 1-1 or 1-2. In short, each of these light scattering films 1-1 and 1-2 exhibits various light scattering properties dependent on the incident angle of the incident light.

Figure 3:
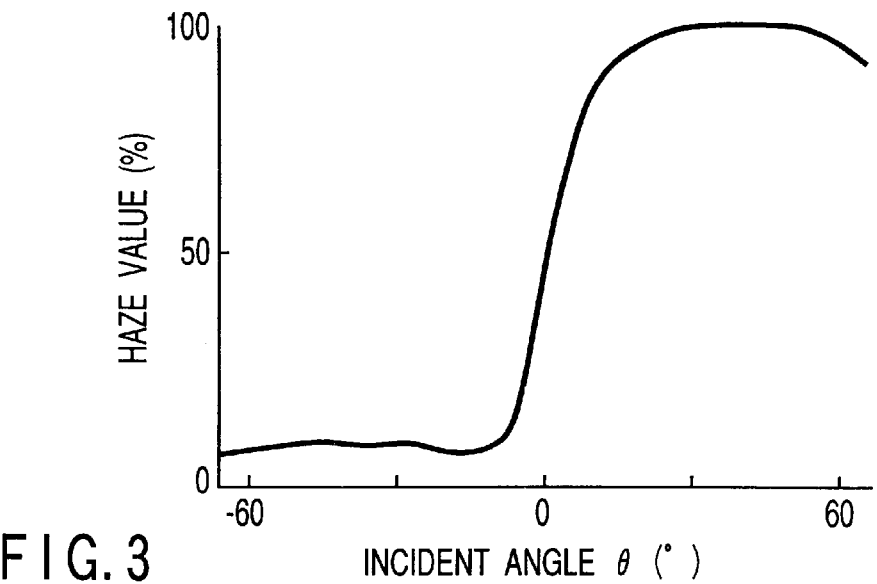
FIG. 3 is a graph exemplifying the relationship between the light scattering performance and the incident angle in the light scattering film according to the first and second embodiments of the present invention.

FIG. 3 is a graph exemplifying a relationship between the incident angle θ of the incident light 4 and the light scattering properties of the light scattering films 1-1 and 1-2. In the graph of FIG. 3, the incident angle θ of the incident light 4 incident on the light scattering film 1-1 or 1-2 is plotted on the abscissa, with the haze value being plotted on the ordinate. As shown in the graph, a haze value of 80% or more can be obtained where the incident angle θ is larger than about 0°. On the other hand, where the incident angle is smaller than about 0°, the haze value is smaller than 20%. As apparent from the graph of FIG. 3, each of the light scattering films 1-1 and 1-2 exhibits various light scattering properties dependent on the incident angle of the incident light.

Incidentally, the light scattering film 1-2 makes it possible to widen the range of the angle θ within which the light scattering can be brought about, compared with the light scattering film 1-1. The reason for the particular phenomenon is as follows.

Specifically, the second embodiment differs from the first embodiment in that the transparent regions 2 and 3 in the second embodiment are alternately laminated one upon the other at least partially along the long axis of the fibril-like cross section, as described previously. Also, the boundary between the transparent region 2 and the transparent region 3 in the light scattering film 1-2 is not so clear as in the light scattering film 1-1. Since the light scattering film 1-2 of the second embodiment has the particular construction, the light is scattered in a more complex fashion, compared with the light scattering film 1-1 of the first embodiment. As a result, the light scattering can be brought about in the light scattering film 1-2 of the second embodiment within a wide range of the angle θ, compared with the light scattering film 1-1 of the first embodiment.

As described above, the scattering characteristics of the light scattering film depend on the shape, etc. of the transparent regions 2 and 3. It should also be noted that the angle θ at which the greatest scattering can be obtained can be set at a desired value by controlling the angle made between the long axis of the fibril-like cross section of the transparent region 2 or 3 and the normal line 6. It follows that the relationship between the incident angle θ of the incident light beam 4 and the scattering properties can be made optimum by controlling the angle made between the long axis of the fibril-like cross section of the transparent region 2 or 3 and the normal line 6 and the shapes of the transparent regions 2 and 3.

The light can be anisotropically scattered by the light scattering films 1-1 and 1-2. As described previously, the transparent regions 2 and 3 of the light scattering film 1-1 extend along the long-side of the film 1-1, as shown in FIG. 1A, with the result that the light scattering takes place more greatly in a direction of the short side than in a direction of the long side. On the other hand, the transparent regions 2 and 3 of the light scattering film 1-2 extend along the short side of the film 1-2, as shown in FIG. 2A, with the result that the light scattering takes place more greatly in a direction of the long side than in a direction of the short side. The reasons for the particular phenomena will now be described with reference to FIGS. 4A and 4B.

Figure 4A:
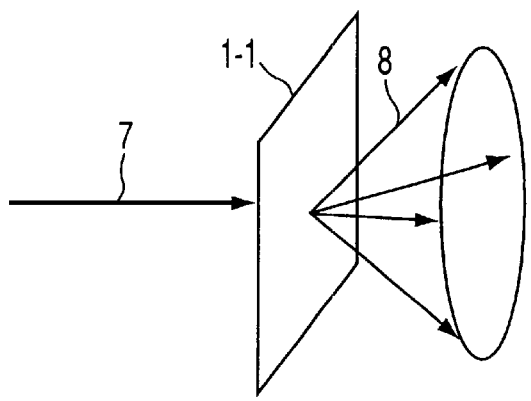
FIG. 4A schematically shows a test method for testing the light scattering performance of the light scattering film shown in FIGS. 1A and 1B.
Figure 4B:
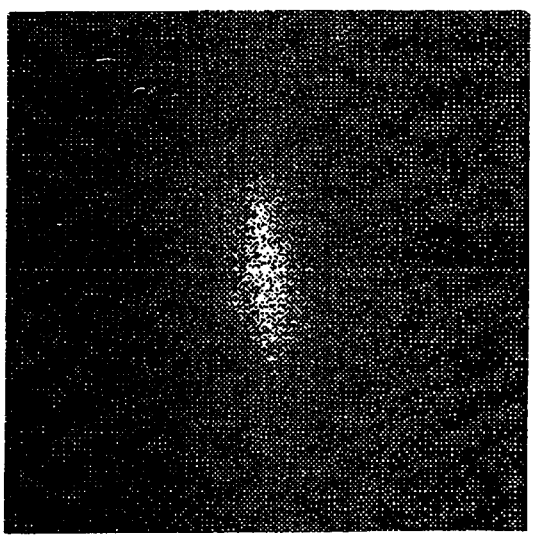
FIG. 4B shows the distribution of the scattered light obtained, by the test method shown in FIG. 4A.

Specifically, FIG. 4A schematically shows a test method for testing the light scattering properties of the light scattering film 1-1 shown in FIGS. 1A and 1B, and FIG. 4B shows the distribution of the scattered light obtained by the film 1-1.

In FIGS. 4A, the light scattering film 1-1 is arranged such that one of the long sides of the film 1-1 forms the bottom side If the light scattering film 1-1 is irradiated with an incident light 7 having a circular cross section perpendicular to the optical axis, the light 7 is scattered by the light scattering film 1-1 so as to form scattered light beams 8. As described previously, the light is scattered by the light scattering film 1-1 more greatly in a direction of the short side than in a direction of the long side. As a result, the scattered light beams 8 assume an elliptical shape elongated in a direction of the short side, as shown in FIGS. 4A and 4B. Incidentally, in the case of using the light scattering film 1-2 in place of the light scattering film 1-1, the scattered light beams 8 assume an elliptical shape elongated in a direction of the long side of the film 1-2.

As described previously, the transparent region 2 and the transparent region 3 differ from each other in refractive index range, with the result that the light scattering properties of the light scattering films 1-1 and 1-2 are varied depending on the incident angle of the incident light. Where the difference in average refractive index between the transparent region 2 and the transparent region 3 is small, the scattering properties are lowered, with the result that the difference in the light scattering properties dependent on the incident angle of the incident light beam is made unduly small in some cases. In such a case, a sufficient light scattering can be obtained by increasing the thickness of the film 1-1 or 1-2. On the other hand, where there is a large difference in average refractive index between the transparent regions 2 and 3, the light is scattered excessively, with the result that the light scattering takes place regardless of the incident angle of the incident light. In such a case, appropriate light scattering properties can be obtained by decreasing the thickness of the film 1-1 or 1-2.

The angle made between the normal line 6 and the long axis of the fibril-like cross section of the transparent region 2 or 3 shown in FIGS. 1B and 2B is not particularly limited, as far as the angle is larger than 0° and smaller than 90°. The particular angle, which depends on the use of the light scattering film 1-1 or 1-2, should generally be 80° or less and 60° or less in many cases.

In the light scattering film 1-1 or 1-2, the difference in average refractive index between the transparent region 2 and the transparent region 3 should desirably fall within a range of between 0.001 and 0.2, and the thickness of the film 1-1 or 1-2 should desirably fall within a range of between 1000 µm and 1 µm. Where these conditions are satisfied, the light scattering properties can be controlled appropriately depending on the incident angle of the incident light. Where, for example, the transparent region 2 has an average refractive index of 1.52, the transparent region 3 has an average refractive index of 1.56, and the film has a thickness of 20 µm, in the light scattering film 1-1 or 1-2, the light. scattering properties can be changed appropriately in accordance with the incident angle of the light while obtaining sufficient light scattering properties.

The light scattering properties of the light scattering film 1-1 or 1-2 are greatly affected by the diameter of the exposed portion of each of the transparent regions 2 and 3 or by the length of the short axis in the fibril-like cross section of each of the transparent regions 2 and 3. In general, the light scattering can be generated, if the length of the short axis in the fibril-like cross section of each of the transparent regions 2 and 3 is 0.1 µm to 300 µm. Also, the average diameter of the exposed portions of the transparent regions 2 and 3 should generally fall within a range of between 0.1 µm and 300 µm. For example, where the average diameter of the exposed portions of the transparent regions 2 or 3 is 12 µm, the spreading of the scattered light can be set at about ±40°.

The volume ratio of the transparent regions 2 to the transparent regions 3 is not particularly limited in the light scattering film 1-1 or 1-2. Also, it is not absolutely necessary for the refractive index within the transparent region 2 or the transparent region 3 to be uniform. Some variation of the refractive index is acceptable. Further, it is not absolutely necessary for the boundary between the transparent region 2 and the transparent region 3 to be clearly defined. Where the refractive index within the transparent region 2 or 3 is nonuniform or where the boundary between the transparent region 2 and the transparent region 3 is unclear, the light is scattered in a more complex fashion. It follows that the particular construction of the transparent regions 2 and 3 permit widening the range of the angle θ within which the light scattering can be brought about. Also, light reflection at the boundary between the transparent regions 2 and 3 may be decreased, and therefore, losses of light toward the rear can be suppressed.

In the light scattering film 1-1 shown in FIG. 1A, the exposed portions of the transparent regions 2 and 3 extend along the long side of the film 1-1. However, these transparent regions 2 and 3 may be shaped oppositely. For example, it is possible for the exposed portions of these transparent regions 2 and 3 to extend along the short side of the film 1-1. In this case, the light can be scattered in a greater amount along the long side of the film 1-1 than along the short side of the film 1-1. Further, the exposed portions of the transparent regions 2 and 3 may be shaped, for example, circular. In this case, the light scattering properties can be varied depending on the incident angle of light, though the transmitted light is diffused isotropically.

In the light scattering film 1-1 shown in FIGS. 1A and 1B, the long-axis of the exposed portion of each of the transparent regions 2 and 3 make an angle of 90° with the direction of the fibril-like cross section of each of these transparent regions 2 and 3. However, the angle noted above is not particularly limited in the present invention. In other words, the direction of the incident light in which the light is scattered and the diffusing direction of the transmitted light can be controlled independently.

The description given above also applied to the light scattering film 1-2. Specifically, in the light scattering film 1-2 shown in FIG. 2A, the exposed portions of the transparent regions 2 and 3 extend along the short side of the film 1-2. However, these exposed portions may also be shaped oppositely. For example, it is possible for these exposed portions of the transparent regions 2 and 3 to extend along the long side of the film as in the film 1-1 shown in FIG. 1A. In this case, the light can be scattered in a greater amount along the short side of the film 1-2 than along the long side of-the film 1-2. Further, the exposed portions of the transparent regions 2 and 3 may be shaped, for example, circular. In this case, the light scattering properties can be varied depending on the incident angle of light, though the transmitted light is diffused isotropically.

Also, in the light scattering film 1-2 shown in FIGS. 2A and 2B, the long axis of the exposed portion of each of the transparent regions 2 and 3 make an angle of 90° with the direction of the fibril-like cross section of each of these transparent regions 2 and 3. However, the angle noted above is not particularly limited in the present invention. In other words, the direction of the incident light in which the light is scattered and the diffusing direction of the transmitted light can be controlled independently, as already described in conjunction with the light scattering film 1-1.

The light scattering films 1-1 and 1-2 described above can be prepared, for example, as follows. The method of preparing the light scattering film 1-1 will be described first.

Figure 5:
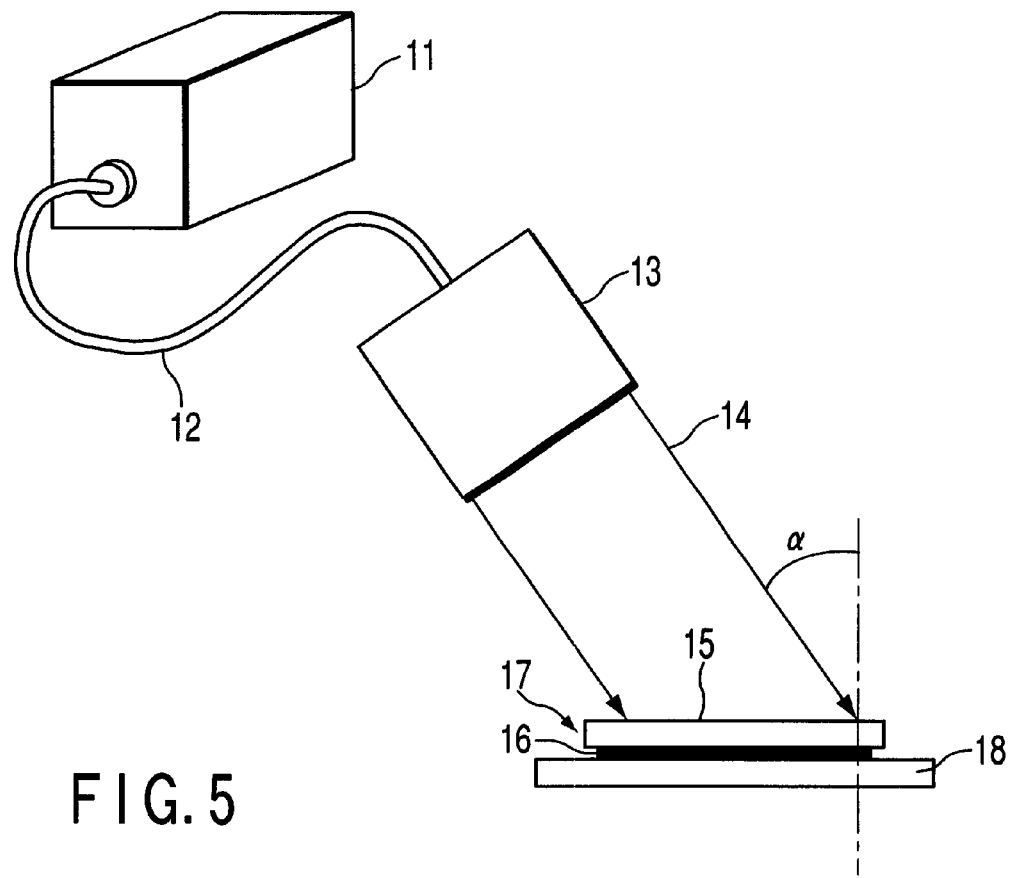
FIG. 5 schematically shows an apparatus used for manufacturing the light scattering film according to the first embodiment of the present invention.

FIG. 5 schematically shows an apparatus for manufacturing the light scattering film 1-1 according to the first embodiment of the present invention. The manufacturing apparatus shown in FIG. 5 comprises mainly a light source 11, an optical fiber 12, and a collimator 13. The light such as a UV light, which is emitted from the light source 11, is transmitted to the collimator 13 via the optical fiber 12. The UV light emitted from the light source 11 is converted by the collimator 13 into a parallel light 14.

In manufacturing the light scattering film 1-1 by using the apparatus shown in FIG. 5, a specially designed mask 17 is attached tight to a photosensitive film 18 in the first step. The photosensitive film 18, contains a photosensitive material. When the photosensitive film 18 is selectively irradiated with the UV light through the mask 17, a difference in refractive index is generated between the irradiated portion and the non-irradiated portion of the photosensitive film 18. It is desirable for the photosensitive material constituting the photosensitive film 18 to exhibit a high resolution. With increase in the resolution of the photosensitive material, the boundary between the transparent regions 2 and 3 of the light scattering film 1-1 is made clear, making it possible to form the transparent regions 2 and 3 in desired shapes. However, it is possible for the resolution of the photosensitive material to be low. Where the photosensitive material has a low resolution, the boundary between the transparent regions 2 and 3 of the light scattering film 1-1 is made unclear, leading to the particular effects described previously.

The photosensitive film 18 or the photosensitive material used in the present invention includes, for example, photosensitive materials as those used for a volume type hologram such as "8E56 dry plate" (trade name of a silver salt photosensitive material for a hologram manufactured by Agpha Inc.), "HRF film" (trade name of a photosensitive material for a hologram manufactured by Du Pont, Inc.), dichromated gelatin, photopolymer, and "DMP-128" (trade name of a recording material manufactured by Polaroid Inc.).

In general, the thickness of the photosensitive film 18 should be 1 μm to 100 μm. On the other hand, the size of the photosensitive film 18 is not particularly limited and can be at, for example, about 5 inches×4 inches.

The mask 17 consists of, for example, a transparent substrate 15 and a mask pattern 16 formed on the substrate 15. The mask pattern 16 can be formed by forming a metal chromium layer on the transparent substrate 15 made of glass, followed by patterning the metal chromium layer by employing a photolithography method and an etching method. Monochromatic pattern data obtained by a random number calculation using a computer are used for forming the mask pattern 16, which is a random pattern. The mask 17 can also be prepared by a photographic process using a photo lithographic plate, as known to the art.

As shown in FIG. 5, the mask 17 attached to the photosensitive film 18 is arranged to face the collimator 17. In this case, an angle α made between a line normal to a main surface of the mask 17 and the optical axis of the parallel light 14 should be made equal to the angle made between the normal line 6 shown in FIG. 1B and the long axis of the fibril-like cross section of the transparent region 2 or 3.

After arrangement of the photosensitive film 18 to permit the mask 17 to face the collimator 13, a UV light is emitted from the light source 11. As a result, the mask 17 is obliquely irradiated with the parallel light coming from the collimator 13 so as to expose the photosensitive film 18 to light in a random pattern. Then, a developing treatment, a bleaching treatment, a water-wash treatment, a drying treatment, etc. are applied, as desired, to the photosensitive filming so as to obtain the light scattering film 1-1 shown in FIGS. 1A and 1B. For silver halide photo sensitive materials, a developing solution used in the manufacture of a hologram such as a CWC developing solution can be used for the developing treatment. Also, a bleaching solution used in the manufacture of a hologram such as PBQ2 bleaching solution can be used for the bleaching treatment.

The method of manufacturing the light scattering film 1-2 will now be described.

Figure 6:
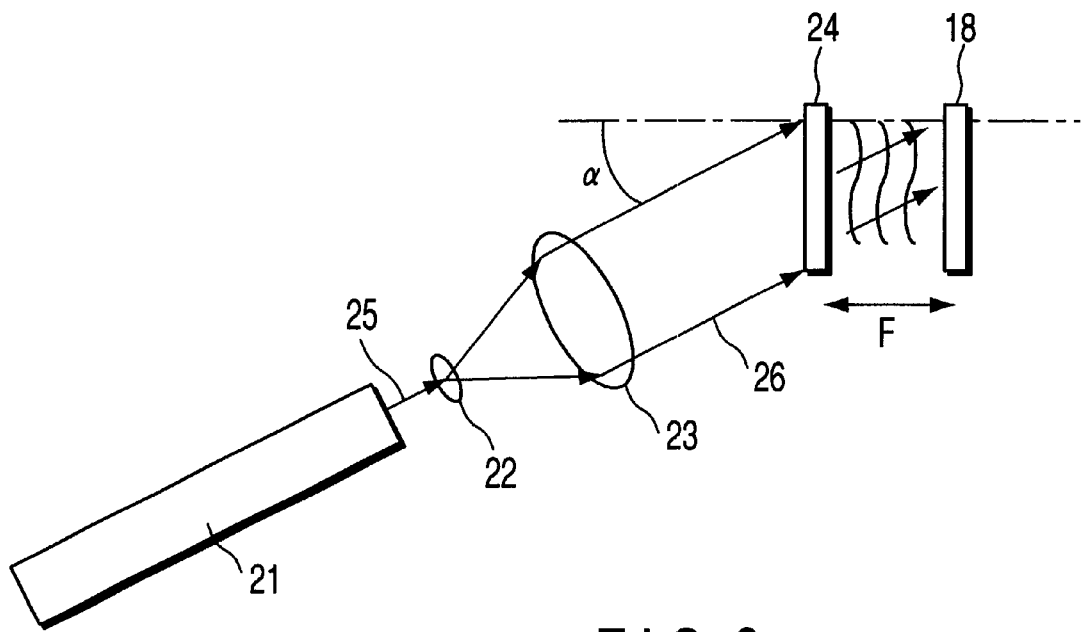
FIG. 6 schematically shows an apparatus used for manufacturing the light scattering film according to the second embodiment of the present invention.

Specifically, FIG. 6 schematically shows an apparatus used for manufacturing the light scattering film 1-2 according to the second embodiment of the present invention. The manufacturing apparatus shown in FIG. 6 comprises mainly a laser beam source 21, a beam expander 22, a collimator 23, and a ground glass plate 24.

In manufacturing the light scattering film 1-2 by using the apparatus shown in FIG. 6, the photosensitive film 18 is arranged first in parallel to the glass plate 24. In this step, the angle α made between a line normal to a main surface of the photosensitive film 18 and the optical axis of a parallel light 26 should be made equal to the angle made between the normal line 6 shown in FIG. 2B and the long axis of the fibril-like cross section of the transparent region 2 or 3. Also, the distance between the photosensitive film 18 and the glass plate 24 is set at F.

In the next step, a laser beam 25 is emitted from the laser beam source 21. The laser beam source 21 is formed of, for example, an argon ion laser. In the case of using an argon ion laser as the laser beam source 21, it is desirable to use as the laser beam 25 any of a green light component having a wavelength of 514.5 nm, a bluish green light component having a wavelength of 488 nm and a blue light component having a wavelength of 457.9 nm depending on the sensitivity, etc. of the photosensitive material constituting the photosensitive film 18. A light source other than the argon ion laser can also be used as the laser beam source 21. For example, a laser beam source satisfactory in coherence such as a helium neon laser or a krypton ion laser can also be used as the laser beam source 21.

The diameter of the laser beam 25 emitted from the light source 21 is expanded by the beam expander 22 and, then, converted into a parallel light by the collimator 23. The parallel light 26 is transmitted through the ground glass plate 24 so as to irradiate the photosensitive film 18.

The parallel light 26 transmitted through the ground glass plate 25 forms a complex interference pattern called speckle pattern, which corresponds to the pattern consisting of the transparent regions 2 and 3 shown in FIG. 2A, on the surface of the photosensitive film 18. In other words, the photosensitive film 18 is exposed to light forming a speckle pattern. Then, a developing treatment, a bleaching treatment, a water-wash treatment, and a drying treatment are applied, as desired, so as to obtain the light scattering film 1-2 shown in FIGS. 2A and 2B.

The speckle pattern is a spotted pattern of brightness generated when light having a high coherence is subjected to an irregular reflection on or is transmitted through a rough surface. The speckle pattern is also formed by an irregular interference of light scattered by fine projections and depressions on a rough surface.

The speckle pattern is varied depending on the distance F between the ground glass plate 24 and the photosensitive film 18, with the result that the speckle pattern formed on the surface of the photosensitive film 18 differs from that formed deep inside the photosensitive film 18. It follows that the transparent regions 2 and 3 are laminated one upon the other in the direction of the long axis of the fibril-like cross section in the light scattering film 1-2 thus formed, as shown in FIG. 2B.

In the light scattering film 1-2 formed by the method described above, the average diameter d of the exposed portion of each of the transparent regions 2 and 3 is dependent on the wavelength λ of the laser beam 25, the average length D of the side of the ground glass plate 24 and the distance F between the ground glass plate 24 and the photosensitive film 18, and is represented by an equation:

$$d = 1.2 \lambda F/D.$$

On the other hand, an average length t in the direction of the long axis of the fibril-like cross section of each of the transparent regions 2 and 3 shown in FIG. 2B is represented by an equation:

$$t = 4.0 \lambda (F/D)^2.$$

It follows that the transparent regions 2 and 3 can be controlled in a desired shape by setting appropriately the values of λ and F/D. For example, where the wavelength λ is 0.5 μm and F/D is 2, d is 1.2 μm and t is 8 μm. In other words, the average diameter in the exposed portion of the transparent regions 2 and 3 is 1.2 μm. On the other hand, the average length in the direction of the long axis of the fibril-like cross section of each of the transparent regions 2 and 3 is 8 μm.

To reiterate, d and t obtained by the equations given above denote average values. Needless to say, the actual diameter in the exposed portion and the actual length in the direction of the long axis of the fibril-like cross section of each of the transparent regions 2 and 3 are not uniform.

In the method described above, the size of the ground glass plate 24 falls within a range of between, for example, 1 mm×1 mm and 500 mm×500 mm. The light scattering properties of the ground glass plate 24 also give influences to the size, etc. of the transparent regions 2 and 3. In general, the ground glass plate 24 is formed of a ground glass of No. 10 to No. 10,000. Also, the distance F is set to fall within a range of between 0 and 1 m in the method described above.

In the method described above, which utilizes a speckle pattern, the shapes of the transparent regions 2 and 3 are affected by the shape of the ground glass plate 24. It is described on pages 266 to 268 of. "Hikari Sokutei (Light Measurement) Handbook" edited by Toshiharu Tanaka, et al. and published by Asakura Shoten (Book Store) on Nov. 25, 1994, that, in a speckle pattern, in which the concentration and phase are distributed at random depending on the position, the average diameter of the pattern is inversely proportional to the angle at which the diffusion plate is observed from the photosensitive film. It follows that, where the horizontal length of the ground glass plate 24 is larger than the vertical length, those portions of the transparent regions 2 and 3 which are exposed to the main surface of the light scattering film 1-2 are elongated in the vertical direction.

For example, where the distance F and the ground glass plate 24 shown in FIG. 6 meet the relations $F/D_x=2$ and $F/D_y=20$, where $D_x$ and $D_y$ represent the horizontal and vertical lengths, respectively, of the ground glass plate 24, and the wavelength λ is 0.5 μm, the exposed portions of each of the transparent regions 2 and 3 has an average horizontal length $d_x$ of 1.2 μm and an average length in the vertical direction of 12 μm. In other words, a ratio of the average horizontal length of the exposed portions of each of the transparent regions 2 and 3 to the average vertical length of these exposed portions is 1:10.

As described above, the shapes of the exposed portions of the transparent regions 2 and 3 can be controlled appropriately in accordance with the shape of the ground glass plate 24. It follows that it is possible for the ground glass plate 24 to have various shapes such as a rectangular, circular, oblong, or elliptical shape or be conform by an array of such shape.

In the example described above, the apparatus shown in FIG. 6 was used for manufacturing the light scattering film 1-2. However, another apparatus can also be used for manufacturing the light scattering film 1-2. For example, the laser beam 25 can be converted into a diffused light by using a spatial filter in place of converting the laser beam 25 into a parallel light by using the beam expander 22 and the collimator 23. In this case, an optical lens may be interposed between the ground glass plate 24 and the photosensitive film 18.

A third embodiment of the present invention will now be described. In each of the first and second embodiments, the long axis of the fibril-like cross section of each of the transparent regions 2 and 3 extend obliquely relative to the main surface of the light scattering film 1-1 or 1-2. In the third embodiment, however, the long axis in the fibril-like cross section of each of the transparent regions 2 and 3 is perpendicular to the main surface of the light scattering film 1-3.

Figure 7A:
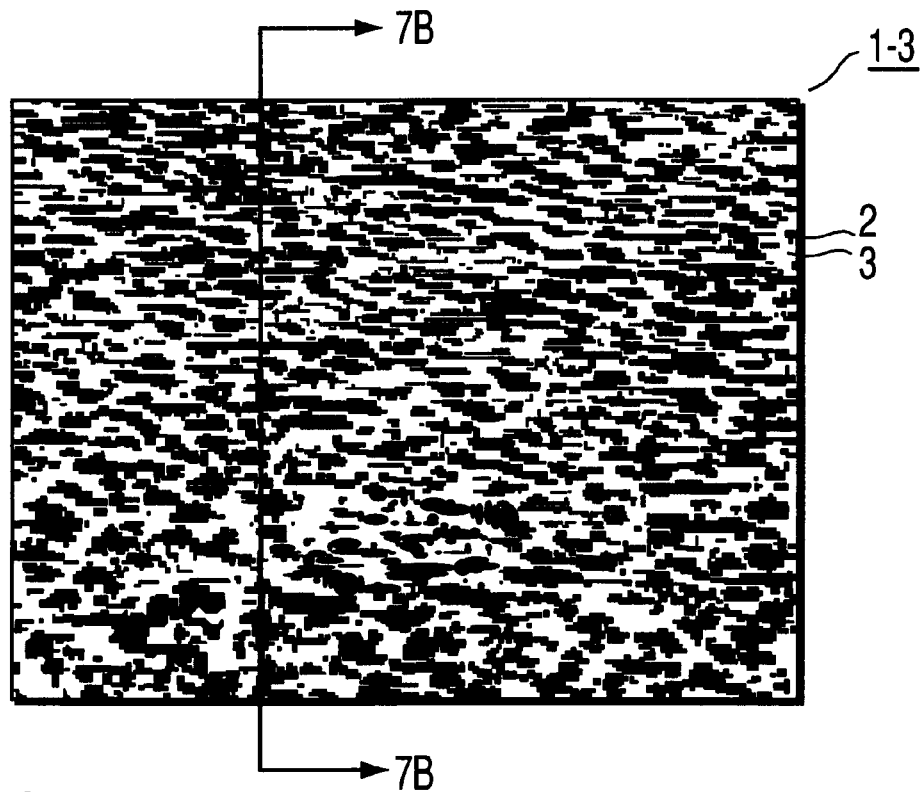
FIG. 7A is a plan view schematically showing the light scattering film according to a third embodiment of the present invention.
Figure 7B:
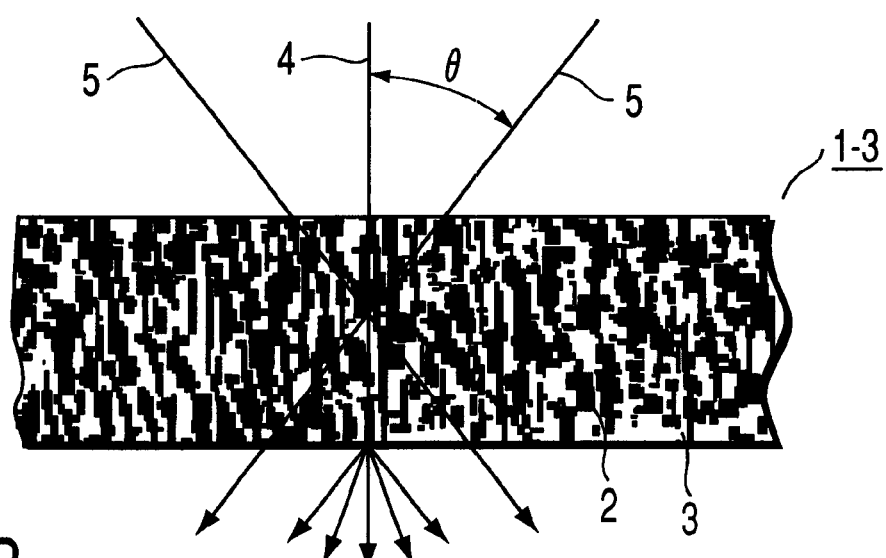
FIG. 7B is a cross sectional view along the line 7B—7B shown in FIG. 7A.

FIG. 7A is a plan view schematically showing the light scattering film 1-3 according to the third embodiment of the present invention. Also, FIG. 7B is a cross sectional view along the line 7B-7B shown in FIG. 7A. As shown in FIG. 7A, the light scattering film 1-3 according to the third embodiment of the present invention is horizontally long sized., Also, the light scattering film 1-3 consists of transparent regions 2 and 3, as shown in FIGS. 7A and 7B.

The transparent region 2 differs from the transparent region 3 in refractive index range. Also, each of the transparent regions 2 and 3 has a fibril-like cross section, and the cross section of each of these regions 2 and 3 extend in a direction perpendicular to the main surface of the film 1-3. In other words, these transparent regions 2 and 3 are formed to have fibril-like shape, and alternately laminated one upon the other in directions parallel and perpendicular to the main surface of the light scattering film 1-3. Incidentally, it is possible for the light scattering film 1-3 shown in FIG. 7B to be equal in construction to the film 1-1 shown in FIG. 1B, as far as the fibril-like cross section of each of the transparent regions 2 and 3 extend in a direction perpendicular to the main surface of the film.

The optical characteristics of the light scattering film 1-3 will now be described. Suppose the upper surface of the light scattering film 1-3 is irradiated with light 4 in a direction parallel to the long axis of the fibril-like cross section of the transparent regions 2 and 3, as shown in FIG. 7B. In this case, if the length in a direction of the short axis of the fibril-like cross section of the transparent regions 2 and 3 is sufficiently small, the incident light 4 brings about diffraction so as to be diffused. On the other hand, where the incident light 5 is obliquely incident on the surface of the film 1-3 relative to the long axis of the fibril-like cross section of the transparent regions 2 and 3, the incident light 5 is scarcely diffused so as to be transmitted through the film 1-3, as shown in FIG. 7B. In short, the light scattering film 1-3 according to the third embodiment of the present invention exhibit the light scattering properties dependent on the incident angle of the incident light.

Like the light scattering films 1-1 and 1-2 described previously, the light scattering film 1-3 of the third embodiment also permits anisotropically diffusing the incident light. In the light scattering film 1-3 shown in FIG. 7A, the transparent regions 2 and 3 extend along the long side of the film 1-3, as already described, with the result that light is scattered more greatly in the direction of the short side than in the direction of the long side of the film 1-3.

The light scattering film 1-3 can be manufactured by the method similar to that described previously in conjunction with FIGS. 5 and 6, except that the angle α is set at 0°.

A fourth embodiment of the present invention will now be described. In the fourth embodiment of the present invention, the light scattering films 1-1 or 1-2 described previously in conjunction with the first or second embodiment of the present invention are laminated one upon the other to form a laminate structure.

Figure 8A:
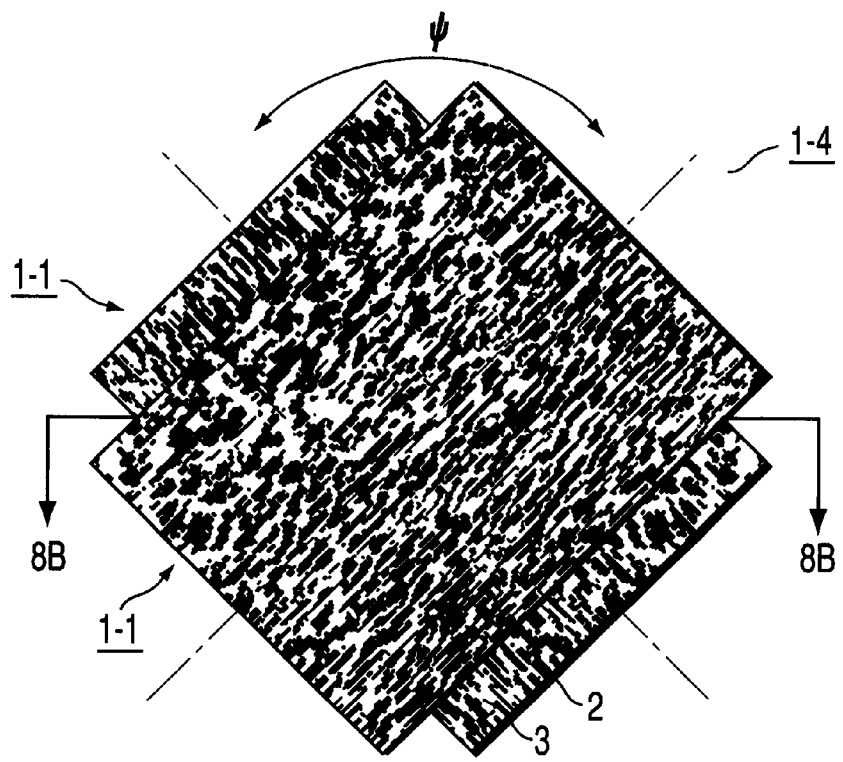
FIG. 8A is a plan view schematically showing the light scattering film according to a fourth embodiment of the present invention.
Figure 8B:
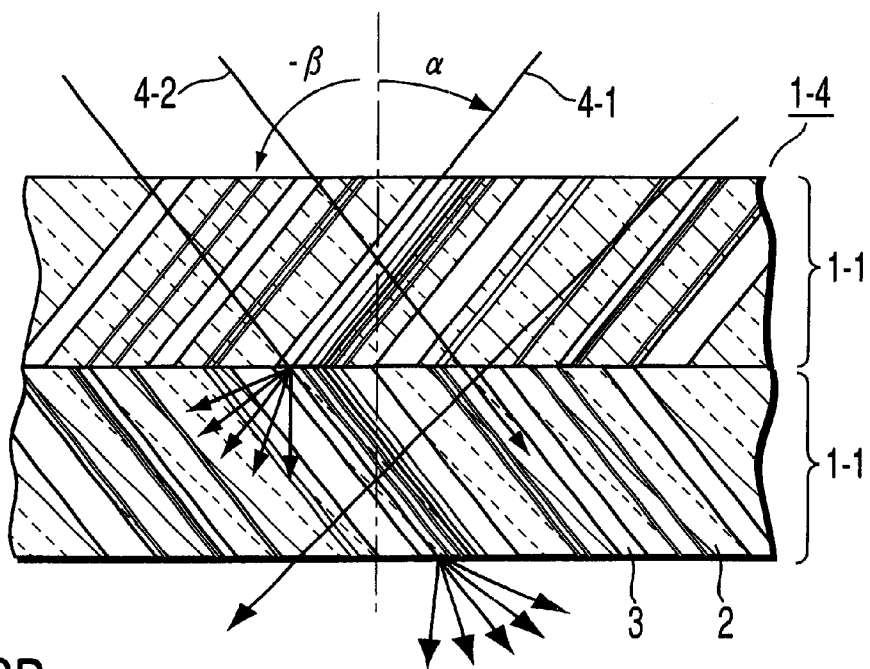
FIG. 8B is a cross sectional view along the line 8B—8B shown in FIG. 8A.

Specifically, FIG. 8A is a plan view schematically showing a light scattering film 1-4 according to the fourth embodiment of the present invention. On the other hand, FIG. 8B is a cross sectional view along the line 8B-8B shown in FIG. 8A. As apparent from FIGS. 8A and 8B, the light scattering film 1-4 according to the fourth embodiment of the present invention is a laminate film prepared by laminating two light scattering films 1-1 of the first embodiment one upon the other. Each of these two light scattering films 1-1 is oblong, and these films 1-1 are laminated one upon the other such that the long sides of these films cross each other, as shown in FIG. 8A. Also, the light scattering film 1-4 consists of transparent regions 2 and 3, as shown in FIGS. 8A and 8B.

The transparent region 2 differs from the transparent region 3 in refractive index range. Also, in each of the component films 1-1, the exposed portions of the transparent regions 2 and 3 are irregularly elongated along the long side of the light scattering film 1-1. Each of these transparent regions 2 and 3 has a fibril-like cross section, as shown in FIG. 8B. Further, the lower film 1-1 and the upper film 1-1 differ from each other in the direction of inclination of the fibril-like cross section of each of the transparent regions 2 and 3, as shown in FIG. 8B.

Because of the above-noted particular construction of the light scattering film 1-4, an incident light 4-1 is diffused in the upper film, with an incident light 4-2 being diffused in the lower film. It follows that the multi-layer structure shown in FIGS. 8A and 8B makes it possible to widen a range of incident angles within which the light can be scattered, compared with the light scattering film 1-1 of a single layer structure. Incidentally, the angle of inclination of the fibril-like cross sections of the transparent regions 2 and 3 included in the upper film may be equal to or differ from that in the lower film.

As shown in FIG. 8A, the two light scattering films 1-1 are laminated one upon the other such that the long sides of these two films cross each other at an angle φ. Also, the exposed portions of the transparent regions 2 and 3 are elongated along the long side of the film 1-1. It follows that the light scattering film 1-4 according to the fourth embodiment of the present invention makes it possible to control the degree of anisotropy relating to the light scattering by setting the angle φ appropriately.

It may be desirable for the angle φ to be at least 10°. If the angle φ is smaller than 10°, the laminate structure may fail to produce its effect sufficiently. Also, the angle φ should desirably be 90° or less. If the angle φ exceeds 90°, the light tends to be scattered isotropically.

The light scattering film 1-4 shown in FIGS. 8A and 8B consists of two light scattering films 1-1 which are laminated one upon the other. However, more than two light scattering films 1-1 may be laminated one upon the other to prepare the light scattering film of a laminate structure. Further, a plurality of the light scattering films 1-2 shown in FIGS. 2A and 2B may be laminated one upon the other to prepare a light scattering film of a laminate structure.

A fifth embodiment of the present invention will now be described. In the fifth embodiment, the light scattering films 1-1 or 1-2 are laminated one upon the other like the film 1-4 of the fourth embodiment.

Specifically, FIG. 9A is a plan view schematically showing a light scattering film according to the fifth embodiment of the present invention, and FIG. 9B is a cross sectional view along the line 9B-9B shown in FIG. 9A. As apparent from FIGS. 9A and 9B, the light scattering film 1-5 according to the fifth embodiment of the present invention is a laminate film prepared by laminating two light scattering films 1-1 of the first embodiment one upon the other. Each of these two light scattering films 1-1 is oblong, and these films 1-1 are laminated one upon the other such that the long sides of these films are parallel to each other, as shown in FIG. 9A. Also, the light scattering film 1-5 consists of transparent regions 2 and 3, as shown in FIGS. 9A and 9B.

The transparent region 2 differs from the transparent region 3 in refractive index range. Also, in each of the component films 1-1, the exposed portions of the transparent regions 2 and 3 are irregularly elongated along the long side of the light scattering film 1-1. Each of these transparent regions 2 and 3 has a fibril-like cross section, as shown in FIG. 9B. Further, the lower film 1-1 and the upper film 1-1 slightly differ from each other in the direction of inclination of the fibril-like cross section of each of the transparent regions 2 and 3, as shown in FIG. 9B.

Because of the particular construction, incident lights 5-1 and 5-2 are scarcely diffused so as to be transmitted through the light scattering film 1-5. However, the incident light 4-1 is diffused in the upper layer, and the incident light 4-2 is diffused in the lower layer. It follows that the laminate structure as shown in FIGS. 9A and 9B makes it possible to widen a range of incident angles within which the incident light is scattered, compared with the light scattering film 1-1 of a single layer structure.

The light scattering film 1-5 shown in FIGS. 9A and 9B differs from the light scattering film 1-4 shown in FIGS. 8A and 8B in that the two light scattering films 1-1 are laminated one upon the other such that the long sides of these two films 1-1 are parallel to each other. Also, the exposed portions of the transparent regions 2 and 3 are elongated along the long side of the film 1-1. It follows that the light scattering film 1-5 makes it possible to widen a range of incident angles within which the incident light can be scattered without adversely affecting the anisotropy of the light scattering.

In the light scattering film 1-5 according to the fifth embodiment of the present invention, it is desirable for the upper and lower films 1-1 to have a difference of 10° or more in the angle of inclination of the fibril-like cross section of the transparent regions. If the difference in the angle of inclination is less than 10°, the laminate structure fails to produce its effect sufficiently.

The light scattering film 1-5 shown in FIGS. 9A and 9B consists of two light scattering films 1-1 which are laminated one upon the other. However, more than two light scattering films 1-1 may be laminated one upon the other to prepare the light scattering film of a laminate structure. Further, a plurality of the light scattering films 1-2 shown in FIGS. 2A and 2B may be laminated one upon the other to prepare a light scattering film of a laminate structure.

Each of the light scattering films 1-1 to 1-5 according to the first to fifth embodiments of the present invention can be used in, for example, a liquid crystal display device. Each of sixth to eighth embodiments which are to be described is directed to a liquid crystal display device using the light scattering film of the present invention.

Figure 10:
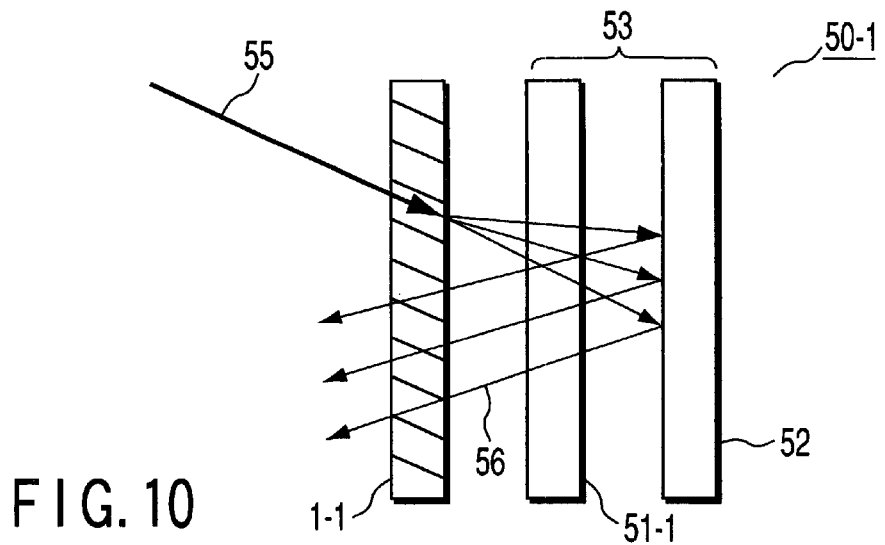
FIG. 10 schematically shows a liquid crystal display device according to a sixth embodiment of the present invention.

FIG. 10 shows a sixth embodiment, a reflective type liquid crystal display device 5-1, using a light scattering film. As shown in the drawing, the liquid crystal display device 50-1 is a reflection type liquid crystal display device, and comprises a reflecting plate 52 arranged on one main surface of a liquid crystal cell 51-1 and the light scattering film 1-1 arranged on the other main surface of the liquid crystal cell 51-1. Incidentally, FIG. 10 is a side view of the liquid crystal display device 50-1. A user is positioned on the left side in the drawing. Also, the oblique lines of the light scattering film 1-1 represent the long axes of the fibril-like cross sections of the transparent regions 2 and 3 shown in FIG. 1B. In this embodiment, the liquid crystal cell reflecting plate 52 collectively constitute a liquid crystal panel 53.

The liquid crystal cell 51-1 shown in FIG. 10 comprises a pair of transparent substrates arranged to face each other, transparent electrodes mounted to the mutually facing surfaces of these transparent substrates, and a liquid crystal layer sandwiched between these transparent substrates. Glass substrates, etc. can be used as the transparent substrates. Also, an ITO layer, etc. can be used as the transparent electrode.

The reflecting plate 52 may be either of a specular reflection type or of a scattering type. The display mode of the liquid crystal cell 51-1 is not particularly limited. Specifically, the display mode may be any of the TN mode, STN mode, guest-host type, polymer dispersion type, etc. Also, a polarization plate, a phase difference plate or other optical films may be mounted, as desired, to the liquid crystal cell 51-1.

It is possible for the liquid crystal display panel 53 to be a monochromatic display panel or a color display panel equipped with color filters, etc. Also, in the liquid crystal display device 50-1 shown in FIG. 10, the liquid crystal display panel 53 consists of the liquid crystal cell 51-1 and the reflecting plate 52. However, the panel 53 may be of another construction.

For example, where a reflective electrode such as an aluminum electrode is substituted for the transparent electrode mounted on the transparent substrate on the opposite side of the user, the liquid crystal panel 53 can be formed of the liquid crystal cell 51-1 alone. In this case, the reflective electrode also acts as a reflecting plate, making it unnecessary to use the reflecting plate 52. Also, in this case, a substrate that does-not transmit light can be substituted for the transparent substrate on the opposite side of the user.

As described above, the liquid crystal panel 53 used in this embodiment is equal in construction to the liquid crystal panel used generally in a reflection type liquid crystal display device. To be more specific, the liquid crystal display device 50-1 according to the sixth embodiment of the present invention differs from the conventional reflecting type liquid crystal display device in that the device 50-1 comprises the light scattering film 1-1.

The method of manufacturing the liquid crystal display device 50-1 will now be described. It should be noted that, if voltage is applied between the transparent electrodes of the liquid crystal cell 51-1, the optical characteristics of the liquid crystal layer, e.g., the light transmittance, are changed. According to the liquid crystal cell 50-1, the light from a light source such as the sun or the external illumination is modulated by the liquid crystal cell 51-1 so as to achieve a desired display.

In the liquid crystal display device 50-1 of this embodiment, the light scattering film 1-1 is arranged on the side of the user. Therefore, the light emitted from the light source such as the sun or an external illumination passes twice through the light scattering film 1-1, i.e., when the light is incident on the liquid crystal cell 51-1 and when the light emerges from the liquid crystal cell 51-1.

As described above, the reflection type liquid crystal display device utilizes the sun light and an external illumination as the light source. In general, these light sources are positioned above the height of the eye of the user. Therefore, the liquid crystal display device 50-1 utilizes the light 55 shown in, for example, FIG. 10 for the display.

In the liquid crystal display device 50-1, the light scattering film 1-1 is arranged such that the long axis of the fibril-like cross section of each of the transparent regions 2 and 3 shown in FIG. 1B is substantially parallel to the optical axis of the incident light 55, with the result that the light 55 incident on the light scattering film 1-1 is diffused to form a diffused light 56, as shown in FIG. 10. The diffused light 56 is transmitted through the liquid crystal cell 51-1 and, then, reflected from the reflecting plate 52 to form a reflected light 56. The light 56 reflected from the reflecting plate 52 is transmitted again through the liquid crystal cell 51-1 so as to reach the light scattering film 1-1.

As described previously with reference to FIG. 1B, the light 4 incident on the light scattering film 1-1 of the first embodiment of the present invention in a direction parallel to the long axis of the fibril-like cross section of each of the transparent regions 2 and 3 is scattered. On the other hand, the light 5 incident on the light scattering film 1-1 in a direction parallel to the short axis of the fibril-like cross section of each of these transparent regions 2 and 3 is transmitted through the light scattering film 1-1 without being scattered. It follows that the light 56 reflected from the reflecting plate 52 is transmitted through the light scattering film 1-1 without being scattered.

As described above, in the reflection type liquid crystal display device 50-1 of this embodiment, the light incident on the liquid crystal cell 51-1 is scattered, and the light emerging from the liquid crystal cell 51-1 is scarcely scattered. In other words, the liquid crystal display device 50-1 makes it possible to prevent an undesired light from being scattered, with the result that the liquid crystal display device 50-1 permits displaying a clear image, It should also be noted that the light scattering film 1-1 used in the liquid crystal display device 50-1 permits diffusing the incident light mainly in a direction of the short side (vertical side in the drawing) of the film 1-1, as already described with reference to FIGS. 4A and 4B. It follows that the liquid crystal display device 50-1 shown in FIG. 10 has a wider viewing angle in the vertical direction than in the horizontal direction.

As described above, the liquid crystal display device 50-1 permits selectively widening the viewing angle in a desired direction. It follows that the liquid crystal display device 50-1 makes it possible to achieve a bright display, compared with the conventional liquid crystal display device using a film that diffuses the light isotropically. What should be noted that the liquid crystal display device 50-1 of this embodiment permits obtaining a wide viewing angle and a sufficiently bright display simultaneously.

Incidentally, the light scattering film 1-1 and the reflecting plate 52 are depicted apart from the liquid crystal cell 51-1 in FIG. 10. However, these film 1-1 and reflecting plate 52 are arranged in contact with the liquid crystal cell 51-1.

In the liquid crystal display device 50-1 shown in FIG. 10, the light scattering film 1-1 is designed to scatter the incident light 55. However, it is also possible to design the film 1-1 to scatter the light incident in other directions. Also, in the liquid crystal display device 50-1 shown in FIG. 10, the light scattering film 1-1 is designed to scatter the incident light 55 in a vertical direction in the drawing. However, the film 1-1 may also be designed to scatter the incident light mainly in a lateral direction. The relative positions of the light source and the liquid crystal display device 50-1 are dependent on the manner of use of the display device 50-1. The relative positions of the liquid crystal display device 50-1 and the user are also dependent on the manner of use of the display device 50-1. It follows that it is desirable to use the light scattering film 1-1 designed to be adapted for the manner of use of the liquid crystal display device.

The light scattering film 1-1 is used in the liquid crystal display device shown in FIG. 10. However, it is also possible to use any of the light scattering films described previously in conjunction with the second, third, fourth and fifth embodiments of the present invention in place of the light scattering film 1-1.

Figure 11:
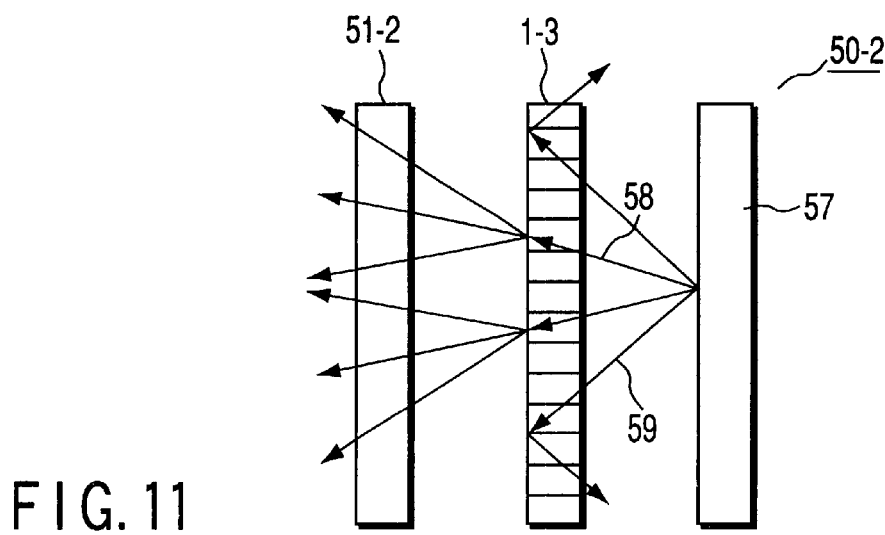
FIG. 11 schematically shows a liquid crystal display device according to a seventh embodiment of the present invention.
Figure 12:
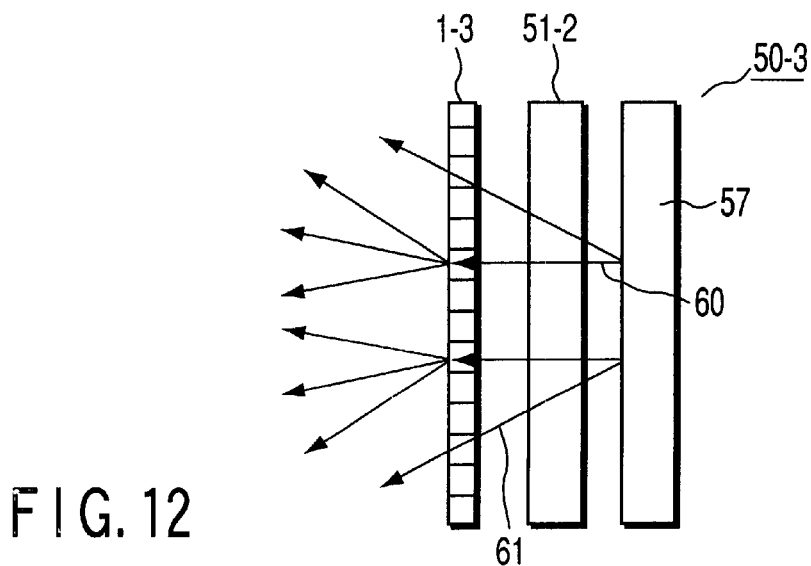
FIG. 12 schematically shows a liquid crystal display device according to an eighth embodiment of the present invention.

FIGS. 11 and 12 show exemplary embodiments of liquid crystal devices using a backlight, also known as transmitting type liquid crystal display devices. In the sixth embodiment described above, the light scattering film 1-1 is applied to a reflection type liquid crystal display device 50-1. In the seventh embodiment, shown in FIG. 10, however, the light scattering film 1-3 is applied to an interior of a transmitting type liquid crystal display device 50-2. In FIG. 12, the light scattering film 1-3 is applied to a surface of a transmitting type liquid crystal display device 50-3.

To be more specific, FIG. 11 is a side view schematically showing a liquid crystal display device 50-2 according to the seventh embodiment of the present invention. The liquid crystal display device 50-2 is of transmitting type. A user is positioned on the left side in the drawing. As shown in the drawing, the light scattering film 1-3 and a light source 57 are arranged in the order mentioned on the opposite side of a liquid crystal cell 51-2 relative to the user. In other words, these light scattering film 1-3 and light source 57 are positioned on the right side of the liquid crystal cell 51-2 in the drawing. The lateral lines within the light scattering film 1-3 represent the long axes of the fibril-like cross sections of the transparent regions 2 and 3 shown in FIG. 7B. Also, the liquid crystal cell 51-2 constitutes a liquid crystal panel in the liquid crystal display device 50-2 shown in FIG. 11.

The liquid crystal cell 51-2 shown in FIG. 11 comprises a pair of transparent substrates arranged to face each other, transparent electrodes formed on the mutually facing surfaces of these transparent substrates, and a liquid crystal layer sandwiched between these transparent substrates. Glass plates or the like can be used as the transparent substrates. On the other hand, an ITO layer or the like can be used as the transparent electrode.

The display mode of the liquid crystal cell 51-2 is not particularly limited. The display mode may be any of the TN mode, STN mode, guest-host type, polymer dispersion type, etc. Also, a polarization plate, a phase difference plate, or other optical films may be formed, as desired, in the liquid crystal cell 51-2. Further, the liquid crystal cell 51-2 may be either a monochromatic display panel or a color display panel equipped with a color filter layer, etc.

The liquid crystal cell 51-2 used in this embodiment is similar in construction to the liquid crystal cell used in general in a transmitting type liquid crystal display device. Specifically, the liquid crystal display device 50-2 in this embodiment differs from the conventional transmitting type liquid crystal display device in that the device 50-2 comprises the light scattering film 1-3.

The display function of the liquid crystal display device 50-2 will now be described. Specifically, if a voltage is applied between the transparent electrodes of the liquid crystal cell 51-2, the optical characteristics, e.g., light transmittance, of the liquid crystal layer is varied. According to the liquid crystal display device 50-2, the light emitted from the light source 57 called back light is modulated by the liquid crystal cell 51-2 so as to perform display.

In the liquid crystal display device 50-2 of the embodiment, the light scattering film 1-3 is arranged between the liquid crystal cell 51-2 and the back light 57, with the result that the light emitted from the back light 57 is transmitted through the light scattering film 1-3 only when the light is incident on the liquid crystal cell 51-2.

As already described in conjunction with the third embodiment, the light scattering film 1-3 scatters the light incident on the film 1-3 in a direction normal to the main surface of the film 1-3. Also, the range of the incident angle within which the incident light can be scattered can be controlled by controlling the shape, etc. of the transparent regions 2 and 3. It follows that, among the light emitted from the back light 57, the light 58 having a small incident angle can be scattered without scattering the light 59 having a large incident angle, as shown in FIG. 11.

In general, the light 59 having a large incident angle is not transmitted through the light scattering film 1-3 but is subjected to total reflection. The light 59 subjected to total reflection is repeatedly scattered and reflected within the back light 57, with the result that almost all the light 59 reaches again the light scattering film 1-3. In other words, almost all the light emitted from the back light 57 is utilized for the display in the liquid crystal display device 50-2. Therefore, since loss of light is suppressed, a bright display can be obtained in the liquid crystal display device 50-2.

In the light scattering film 1-3 shown in FIG. 11, it is desirable for the range of incident angles within which the incident light can be scattered to be equal to the optimum range of modulation performed in the liquid crystal cell 51-2, i.e., the range between about −30° and about +30°. Where the film 1-3 meets this condition, a high display contrast can be obtained.

In the liquid crystal display device 50-2, the light diffusing direction can be controlled by the method similar to that described previously in conjunction with the sixth embodiment. It follows that the liquid crystal display device 50-2 of the seventh embodiment also permits obtaining a wide viewing angle and a sufficiently bright display simultaneously.

The liquid crystal cell 51-2 and the light scattering film 1-3 are depicted apart from each other in FIG. 11. However, these liquid crystal cell 51-2 and light scattering film 1-3 are arranged in general in contact with each other.

An eighth embodiment of the present invention will now be described. In the eighth embodiment, the light scattering film 1-3 is applied to a transmitting type liquid crystal display device, as in the seventh embodiment. However, the position of the light scattering film 1-3 in the liquid crystal display device of the eighth embodiment differs from that in the seventh embodiment.

To be more specific, FIG. 12 is a side view schematically showing a liquid crystal display device 50-3 according to the eighth embodiment of the present invention. The liquid crystal display device 50-3 is of a transmitting type. A user is positioned on the left side in the drawing. As shown in the drawing, the light scattering film 1-3 is positioned on the side of the user relative to the liquid crystal cell 51-2, and the light source 57 is positioned on the opposite side of the user relative to the liquid crystal cell 51-2 in the liquid crystal display device 50-3. Incidentally, the liquid crystal cell 51-2 shown in FIG. 12 constitutes a liquid crystal panel. Also, the lateral lines within the light scattering film 1-3 denote the long axes of the fibril-like cross sections of the transparent regions 2 and 3 shown in FIG. 7B.

In the liquid crystal display device 50-3 of this embodiment, the light scattering film 1-3 is arranged on the side of the user relative to the liquid crystal cell 51-2. It follows that the light emitted from the back light 57 is transmitted through the light scattering film 1-3 only when the emitted light emerges from the liquid crystal cell 51-2.

Among the light incident on the light scattering film 1-3, the light 60 alone, which has a small incident angle on the film 1-3, is scattered. As described previously, the range of incident angles adapted for the modulation within the liquid crystal cell 51-2 is between −30° and +30°. Since the light scattering film 1-3 permits selectively diffusing the light 60 whose incident angle falls within the range noted above, the liquid crystal display device 50-3 of this embodiment permits achieving a high display contrast.

On the other hand, the light 61 having a large incident angle on the light scattering film 1-3 is transmitted without being scattered. Also, the light 61 is not sufficiently modulated within the liquid crystal cell 51-2. It follows that an image having a low contrast, which is formed by the light 61 having a large incident angle on the film 1-3, is not perceived by the user.

It should be noted that the viewing angle of the liquid crystal display device 1-3 is dependent on the diffusing direction of the light 60. Also, the diffusing direction of the light 60 can be controlled, as described previously. It follows that the liquid crystal display device 50-3 makes it possible to obtain a wide viewing angle and a high display contrast simultaneously. Incidentally, the liquid crystal cell 51-2 and the light scattering film 1-3 are depicted apart from each other in FIG. 12. However, these liquid crystal cell and light scattering film are generally arranged in contact with each other.

As described above, the light scattering film of the present invention comprises a plurality of first transparent regions each having a fibril-like cross section and a plurality of second transparent region interposed between adjacent first transparent regions. The first and second transparent regions differ from each other in refractive index range. It follows that, where the fibril-like cross section of each of the first transparent regions has a width large enough to diffuse the light incident in a direction parallel to the long axis of the fibril-like cross section, the light incident on the light scattering-film in a direction parallel to the long axis of the fibril-like cross section of the first transparent region is scattered, and the light incident in a direction parallel to the short axis of the fibril-like cross section is transmitted without being scattered. In other words, the light scattering film of the present invention exhibits light scattering characteristics dependent on the incident direction of the light.

It follows that, where the light scattering film of the present invention is used in a reflection type liquid crystal display device, it is possible to obtain a clear display. Also, where the particular light scattering film is used in a transmitting type liquid crystal display device, it is possible to obtain a high display contrast. Further, where the particular light scattering film is used in a transmitting type liquid crystal display device, it is possible to obtain a clear display or a bright display.

It should also be noted that, in the present invention, it is possible to impart anisotropy to the light scattering direction by allowing those regions of the first and second transparent regions which are exposed to the main surface of the film to be elongated in substantially one direction. In other words, since the light diffusing direction of the light scattering film can be controlled, it is possible to obtain a wide viewing angle and a sufficiently bright display simultaneously by using the light scattering film of the present invention in a liquid crystal display device. Further, unlike the hologram, the light scattering film of the present invention does not split light, and there is not color dispersion to produce spectral distribution, with the result that the color of the displayed image is not changed in accordance with movement of the viewing point.

To reiterate, the present invention provides a light scattering film that enables a liquid crystal display device to display a clear image and a liquid crystal display device using the particular light scattering film. The present invention also provide a light scattering film that enables a liquid crystal display device to achieve a wide viewing angle and a bright display and a liquid crystal display device using the particular light scattering film. Further, the present invention provides a light scattering film that enables a liquid crystal display device to prevent the displayed color from being varied depending on the movement of the viewing point and a liquid crystal display device using the particular light scattering film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light scattering film, comprising:
   a first transparent region having a fibril-like cross section; and
   a second transparent region having a fibril-like cross section differing in refractive index range from the first transparent region, wherein the first transparent regions has the fibril-like cross section crossing a main surface of the film and the fibril-like cross sections of the first transparent region is arranged next to the second transparent region.

2. The light scattering film according to claim 1, wherein the long axis of the fibril-like cross section of the first transparent region is substantially parallel to the long axis of the fibril-like cross section of the second transparent region.

3. The light scattering film according to claim 2, wherein the fibril-like cross section of the first and second transparent regions has a width narrow enough to diffuse the light incident in a direction parallel to the long axis.

4. The light scattering film according to claim 2, wherein the long axis of the fibril-like cross section of each of the first and second transparent regions is substantially perpendicular to one main surface of said film.

5. The light scattering film according to claim 2, wherein the long axis of the fibril-like cross section of each of the first and second transparent regions is inclined relative to one main surface of the film.

6. The light scattering film according to claim 2, wherein each of said first and second transparent regions extends from one main surface of the film to reach the other main surface of the film.

7. The light scattering film according to claim 2, wherein said first and second transparent regions are laminated one upon the other at least partially along said long axis.

8. The light scattering film according to claim 2, wherein those portions of the first and second transparent regions which are exposed to one main surface of the film are elongated substantially in one direction.

9. The light scattering film according to claim 2, wherein those portions of the first and second transparent regions which are exposed to one main surface of the film are arranged as a speckle pattern.

10. The light scattering film according to claim 9, wherein said first and second transparent regions are formed by utilizing a speckle pattern.

11. A liquid crystal display device, comprising:
    a liquid crystal panel; and
    a light scattering film mounted on one main surface of the liquid crystal panel, wherein the light scattering film includes
    a first transparent region having a fibril-like cross section and
    a second transparent region having a fibril-like cross section differing in refractive index range from the first transparent region, wherein the first transparent regions has the fibril-like cross section crossing a main surface of the film and the fibril-like cross sections of the first transparent region is arranged next to the second transparent region.

12. The liquid crystal display device according to claim 11, wherein said liquid crystal panel is of reflection type and reflects the light incident on said one main surface of the liquid crystal panel.

13. The liquid crystal display device according to claim 12, wherein the long axes of the fibril-like cross sections of the first transparent region are parallel to each other, the second transparent region has fibril-like cross sections, the long axis of each of the fibril-like cross sections of the first transparent region is substantially parallel to the long axis of each of the fibril-like cross sections of the second transparent region, and the long axis of the fibril-like cross section of each of the first and second transparent region is inclined relative to the one main surface of the liquid crystal display panel.

14. The liquid crystal display device according to claim 11, wherein said liquid crystal panel is of transmitting type and said liquid crystal display device further comprises a light source arranged on the side of said one main surface of the liquid crystal panel.

15. The liquid crystal display device according to claim 14, wherein the long axes of the fibril-like cross sections of the first transparent region are parallel to each other, the second transparent region has fibril-like cross sections, the long axis of each of the fibril-like cross sections of the first transparent region is substantially parallel to the long axis of each of the fibril-like cross sections of the second transparent region, and the long axis of the fibril-like cross section of each of the first and second transparent region is inclined relative to the one main surface of the liquid crystal display panel.

16. The liquid crystal display device according to claim 11, wherein said liquid crystal panel is of transmitting type and said liquid crystal display device further comprises a light source arranged on the side of the other main surface of the liquid crystal panel.

17. The liquid crystal display device according to claim 16, wherein the long axes of the fibril-like cross sections of the first transparent region are parallel to each other, the second transparent region has fibril-like cross sections, the long axis of each of the fibril-like cross sections of the first transparent region is substantially parallel to the long axis of each of the fibril-like cross sections of the second transparent region, and the long axis of the fibril-like cross section of each of the first and second transparent region is inclined relative to the one main surface of the liquid crystal display panel.

* * * * *